Jan. 26, 1932.    C. R. EDMONDSON    1,843,023
BELT CLAMP
Filed Nov. 14, 1930
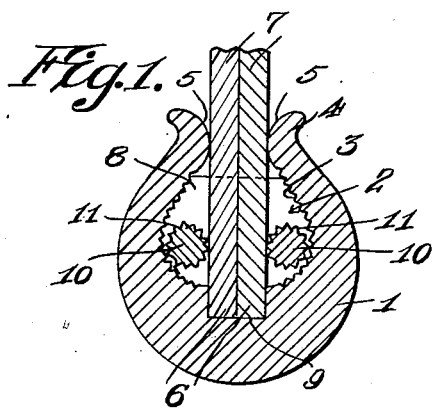
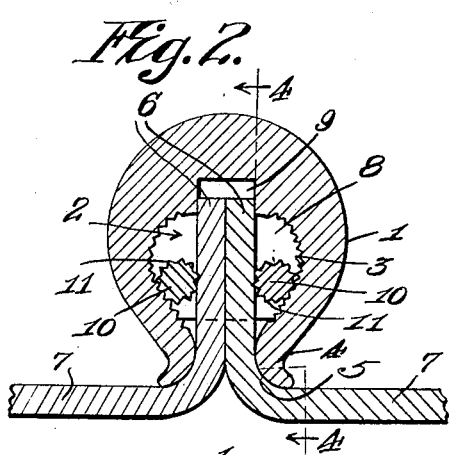
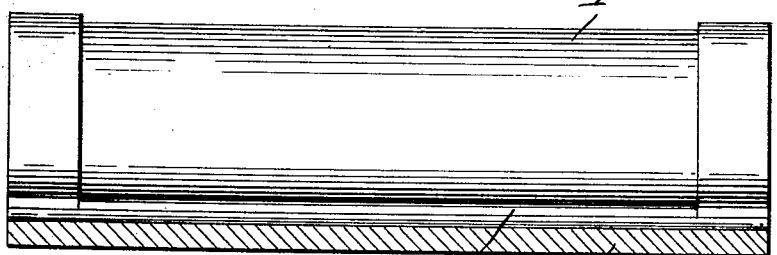
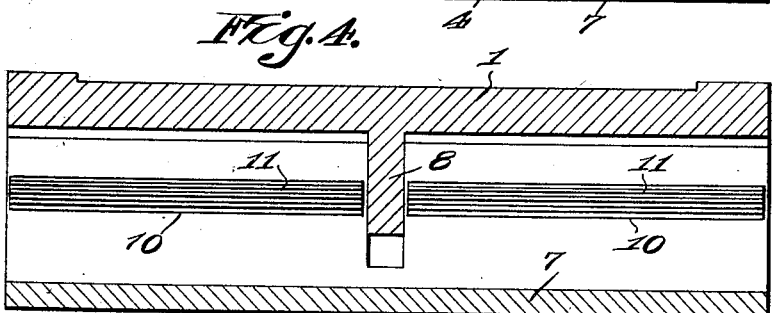
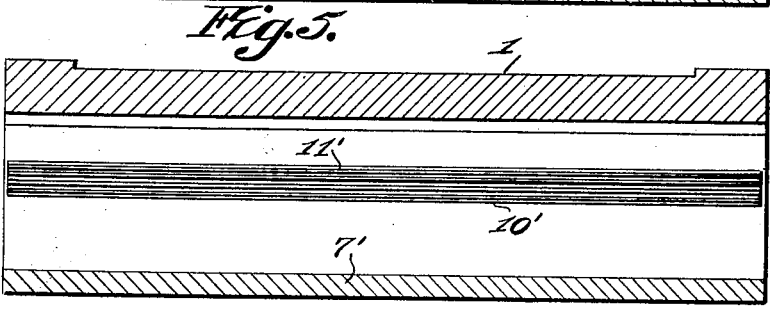
C. R. Edmondson, INVENTOR
BY Victor J. Evans
ATTORNEY Patented Jan. 26, 1932

1,843,023

UNITED STATES PATENT OFFICE

CARY R. EDMONDSON, OF WINFIELD, KANSAS

BELT CLAMP

Application filed November 14, 1930. Serial No. 495,760.

This invention relates to belt clamps and more particularly to a clamp for connecting the ends of an endless belt for use on agricultural machines and in fact anywhere that power is to be transmitted by pulleys and a belt, and the primary object of the invention is to provide a belt clamp which will be devoid of any securing or holding elements requiring to be fitted through the ends of a belt, and which clamp may be readily applied in a moment's time and when it is desired to dismount the belt may be as readily and quickly separated from the belt.

Another object of the invention is to provide a belt clamp so constructed that the clamp means for the connected ends of the belt will not be subjected to any erosive stresses as is the case where the ordinary clamping devices are employed.

Another object of the invention is to provide a clamp so constructed that it will so grip and connect the ends of the belt to which it is applied that there will be no likelihood of any separation of the belt ends regardless of the stresses to which the belt may be subjected or the speed at which it is caused to travel.

This invention also consists in certain other features of construction and in the combination and arrangement of the several parts, to be hereinafter fully described, illustrated in the accompanying drawings and specifically pointed out in the appended claims, it being understood of course that minor changes may be made so long as they fall within the scope of the claims.

In describing my invention in detail, references will be had to the accompanying drawings, wherein like characters denote like or corresponding parts throughout the several views, and in which:—

Figure 1 is a vertical transverse sectional view through the clamp embodying the invention, the view illustrating the positions in which the parts of the clamp are placed, as also the belt ends to be connected, prior to actually clamping the said ends.

Figure 2 is a similar view illustrating the positions assumed by the parts when the belt ends are connected by the clamping action of the device.

Figure 3 is a view in side elevation of the clamp, one end portion of the belt being shown in section.

Figure 4 is a vertical longitudinal sectional view taken on the line 4—4 of Figure 2 looking in the direction indicated by the arrows.

Figure 5 is a similar view illustrating a modification of the invention.

The clamp embodying the invention, in that form shown in Figures 1 to 4 inclusive, comprises a body 1 which is preferably of cast metal and this body is exteriorly of approximately cylindrical form as best shown in Figures 1 and 2 of the drawings, and the body is formed with a longitudinally extending recess 2 and this recess is open at that side of the body which is to be disposed against the end portions of the belt to be connected and the two side walls of the recess are concavely curved in an outward direction and formed each with a series of longitudinally extending ribs 3 which are approximately V-shaped in cross section. At each side of the open side of the recess 2, the body 1 is formed with a laterally outwardly curving rib 4 having a rounded surface 5 and it will be observed by reference to Figures 1 and 2 of the drawings that the recess is somewhat restricted at its open side and, in practice, the rounded portions 5 of the walls of the recess are so spaced as to snugly accommodate between them the assembled ends 6 of the belt 7, which ends are to be connected by the clamp.

Preferably the clamp body is reinforced by a web 8 extending transversely within the recess 2 and between the inner surfaces of the side walls of the recess and, if desired, a longitudinal groove 9 may be formed in the inner side of the wall of the recess between the ribbed side portions 3 so that the edges of the two ends of the belt may engage in this groove as shown in Figures 1 and 2, when the belt ends are fitted into the body 1, or, in order that the insertion of the belt ends into the body will not be interferred with by the said web 8, the belt ends may be formed with notches which will register when the ends are brought together and which are of a width to adapt the side walls of the notches to embrace the opposite sides of the web.

In the embodiment of the invention as above described, clamping rolls 10 are employed and, in this embodiment the rolls are four in number and each roll is of cylindrical form and provided about its circumference with a series of longitudinally extending ribs 11 which are of the same contour as the ribs 3 and these rolls are of such length that when they are inserted endwise, into the opposite ends of the recess 2 and in position to lie between the inserted belt ends and the side walls of the recess, their inner ends will abut against the opposite sides of the web 8 and their outer ends will be substantially flush with the ends of the body 1. The ribs 11 upon the rolls 10 mesh with the ribs 3 upon the inner sides of the walls of the recess 2 and, in clamping the ends of a belt, the belt ends are inserted into the recess in the body 1, the body at this time being disposed in position with the upper side of its recess presented upwardly, and, at this time, the rolls 10 will seat in a wider portion of the recess 2 but, when the belt ends have been fitted into the recess and between the rolls therein, and the clamp is shifted in the direction of the belt, the end portions of the belt, to be connected, will move between the rolls and past the same until the parts have assumed the positions shown in Figure 1.

However, when the belt with the clamp embodying the invention, is overturned, the rolls 10 will ride downwardly along the ribbed surfaces 3 of the recess walls, and as these surfaces are arranged in planes, converging in the direction of the open side of the recess, the rolls will be caused to bear against the opposite sides of the belt ends and, when the belt ends are pulled in an outward direction and the device has been inverted from the position shown in Figure 1, the pull exerted upon the belt or upon the clamping means will result in the ribs 11 biting into the surfaces of the belt ends thereby firmly clamping and retaining the said belt ends within the recess in the body 1 and in mutual binding contact with each other, and at this point it will be understood that the pulling stresses imposed on the belt, as it travels over the pulleys, will serve merely to insure of a maximum clamping of the belt ends by the said rolls. Should it become necessary to separate the ends of the belt, for any reason, this may be readily accomplished by either first dismounting the belt from the pulley about which it is trained or imparting travel to the belt until the clamp is at a point in the length of the lower stretch of the belt, whereupon an upward thrust upon the clamping body will so displace the ribbed walls of the recess with respect to the belt ends and the rolls 10 as to permit these rolls to drop to the positions shown in Figure 1 of the drawings and, at this time the clamp may be slipped off from the ends of the belt. The embodiment illustrated in Figure 5 of the drawings is identical with that shown in Figures 1 to 4 inclusive above described, and therefore corresponding parts are indicated by the same reference numerals primed, except that in this embodiment the web 8 is omitted, and therefore in this embodiment instead of four of the rolls being employed only two are required.

What I claim is:—

1. A belt clamp of the class described comprising a body having a longitudinal recess, in one side, to accommodate the ends of a belt to be connected, the side walls of the recess converging in the direction of the open side of the recess, and cylindrical clamping rolls disposed within the recess to engage between the side walls thereof and the opposite sides of the belt ends, the side walls of the recess having longitudinal ribs.

2. A belt clamp of the class described comprising a body having a longitudinal recess, in one side, to accommodate the ends of a belt to be connected, the side walls of the recess converging in the direction of the open side of the recess, and cylindrical clamping rolls disposed within the recess to engage between the side walls thereof and the opposite sides of the belt ends, the side walls of the recess having longitudinal V-shaped ribs.

3. A belt clamp of the class described comprising a body having a longitudinal recess, in one side, to accommodate the ends of a belt to be connected, the side walls of the recess converging in the direction of the open side of the recess, and cylindrical clamping rolls disposed within the recess to engage between the side walls thereof and the opposite sides of the belt ends, the side walls of the recess having longitudinal V-shaped ribs, the said clamping rolls each having a circumferential series of longitudinal V-shaped ribs.

4. A belt clamp of the class described comprising a body having a longitudinal recess, in one side, to accommodate the ends of a belt to be connected, the side walls of the recess converging in the direction of the open side of the recess, and cylindrical clamping rolls disposed within the recess to engage between the side walls thereof and the opposite sides of the belt ends, the inner wall of the recess having a longitudinal groove to accommodate the end edges of the belt ends.

5. A belt clamp of the class described comprising a body having a longitudinal recess, in one side, to accommodate the ends of a belt to be connected, a reinforcing web spanning the recess between its ends, the side walls of the recess converging in the direction of the open side of the recess, and cylindrical clamping rolls disposed within the recess at opposite sides of the web to engage between the side walls thereof and the opposite sides of the belt ends.

I testimony whereof I affix my signature.

CARY R. EDMONDSON.